United States Patent [19]

Honig et al.

[11] Patent Number: 5,232,680
[45] Date of Patent: Aug. 3, 1993

[54] METHOD FOR PURIFYING HYDROGEN PEROXIDE FOR MICROELECTRONICS USES

[75] Inventors: Helmut Honig, Gelting; Siegfried Geigel, Wolfratshausen, both of Fed. Rep. of Germany

[73] Assignee: Peroxid-Chemie GmbH, Hoellriegelskreuth, Fed. Rep. of Germany

[21] Appl. No.: 841,536

[22] Filed: Feb. 26, 1992

[30] Foreign Application Priority Data

Mar. 7, 1991 [DE] Fed. Rep. of Germany ....... 4107244

[51] Int. Cl.$^5$ ............................................. C01B 15/01
[52] U.S. Cl. .................................................... 423/584
[58] Field of Search .......................................... 423/584

[56] References Cited

U.S. PATENT DOCUMENTS

| | | | |
|---|---|---|---|
| 3,012,860 | 12/1961 | Meeker et al. | 23/207 |
| 3,297,404 | 1/1967 | Elliott et al. | 23/207 |
| 3,556,727 | 1/1971 | Thirion | 423/584 |
| 4,792,403 | 12/1988 | Togo et al. | 423/584 |
| 4,999,179 | 3/1991 | Sugihara et al. | 423/584 |
| 5,055,286 | 10/1991 | Watanabe et al. | 423/584 |

FOREIGN PATENT DOCUMENTS

| | | |
|---|---|---|
| 3822348 | 1/1990 | Fed. Rep. of Germany . |
| 1197655 | 7/1970 | United Kingdom . |

*Primary Examiner*—Wayne Langel
*Attorney, Agent, or Firm*—Foley & Lardner

[57] ABSTRACT

A method for further purifying previously distilled hydrogen peroxide for use in microelectronics in which a hydrogen peroxide starting solution purified initially by distillation is contacted, after the addition of a small amount of chelating agent, with a non-ion-exchanging polymeric adsorbent, such as a styrene-divinylbenzene copolymer, to obtain a highly purified hydrogen peroxide solution which satisfies the stringent purity requirements for use in producing 4-megabit and 16-megabit microprocessor chips.

7 Claims, No Drawings

METHOD FOR PURIFYING HYDROGEN PEROXIDE FOR MICROELECTRONICS USES

BACKGROUND OF THE INVENTION

This invention relates to a method for further purifying hydrogen peroxide containing only small amounts of dissolved inorganic or organic impurities, in order to prepare highly purified hydrogen peroxide suitable for microelectronics uses which require very high purity.

The production of ever more highly integrated circuits for microelectronics requires the preparation of high-performance chips. Although a few years ago storage capacities of 256K were still considered satisfactory, today the one-megabit chip has long held a place in integrated circuits, and the production of microchips with a storage capacity of as much as four megabits has already been undertaken. Rapid progress in microelectronics, especially with the aim of producing 1 and 64 megabit chips, not only calls for high-purity silicon wafers with impurities of less than 1 ppb (1 part per billion parts of silicon) but also requires that the chemicals needed for these super-integrated chips satisfy very stringent purity requirements. Although the production of one-megabit chips tolerates a chemical purity somewhere in the low ppm range (1 part per million), the production of four-megabit and sixteen-megabit chips requires chemical standards with maximum impurity contents in the range of less than 10 ppb.

One of the key chemicals used in chip manufacture which must satisfy these very high purity requirements is hydrogen peroxide. Since hydrogen peroxide, however, is prepared almost exclusively by the anthraquinone process and is ordinarily purified and concentrated by rectification in columns of aluminum or high grade steel, it does not have the required purity. Due to contact with the metal parts of the apparatus, the distillate is contaminated with metals, particularly with aluminum. Besides, hydrogen peroxide manufactured and purified in this manner contains process residues of organic carbon compounds ("organic C"), such as solvents (alcohols, ketones, aliphatic hydrocarbons, acids) and anthraquinone derivatives. For use in microelectronics the hydrogen peroxide must therefore be subjected to an effective post-treatment to decrease its content of cations, anions and carbon to the required degree of purity.

The known purification of hydrogen peroxide solutions by distillation alone does not, however, achieve the necessary purity of the hydrogen peroxide with reference to metal impurities and carbon. For example, distillation fails to eliminate organic carbon from hydrogen peroxide due to the fact that the hydrogen peroxide made by the anthraquinone process contains highly volatile or steam-vaporizable organic carbon compounds. The content of, for example, dissolved organic carbon in the hydrogen peroxide can quite easily exist at levels of up to 150 mg/l. Metal ion and carbon impurities in hydrogen peroxide are especially disturbing in the manufacture of microchips, and the more highly integrated the chips are to be, the more critical is the effect of impurities. Therefore, there has been no lack of attempts in the prior art to remove the impurities from hydrogen peroxide by post-treatment with cation and-/or anion exchangers.

Among the ion exchange materials proposed in the prior art for this purpose are aromatic hydrocarbon cation exchange resins sulfonated on the core for the removal of cations, and aromatic hydrocarbon anion exchange resins containing tertiary amino or quaternary ammonium groups or pyridine rings for the removal of anions. Due to the functional groups contained in these ion exchange resins, the ion exchange resins are often so sensitive to oxidation that, when hydrogen peroxide is purified with these ion exchange resins it is necessary to operate at relatively low temperatures of about 0° C. and to use special apparatus.

The high sensitivity of the ion exchange resins to oxidation is attributable to the fact that, in the presence of heavy metals, such as Fe or Cu etc., hydrogen peroxide can form dangerous hydroxyl radicals which oxidatively attack the carbon skeleton of the ion exchanger and can form easily degradable epoxides or hydroperoxides with it. The epoxides or hydroperoxides that form can not only decompose explosively but can even detonate under certain circumstances. The use of cation or anion exchangers for purifying hydrogen peroxide is therefore questionable for safety reasons and requires special care, since dangerous decomposition of hydrogen peroxide can occur in the ion exchanger.

SUMMARY OF THE INVENTION

It is therefore the object of the invention to provide a method for further purifying previously distilled hydrogen peroxide.

Another object of the invention is to provide a method for purifying hydrogen peroxide for use in microelectronics which overcomes the aforementioned disadvantages of the prior art.

A further object of the invention is to provide a method for purifying hydrogen peroxide which facilitates preparation of high-purity, low-carbon hydrogen peroxide in a simple and safe manner which would satisfy the purity requirements for use in producing chips with storage capacities of 4 and of 16 megabits.

These and other objects of the invention are achieved by providing a method of further purifying distilled hydrogen peroxide containing residual amounts of dissolved inorganic or organic impurities comprising the steps of adding a chelating agent to the distilled hydrogen peroxide, and contacting the hydrogen peroxide with a non-ion-exchanging polymeric adsorbent.

DETAILED DESCRIPTION OF PREFERRED EMBODIMENTS

According to the method of the invention, hydrogen peroxide solutions previously purified by distillation, which contain only small amounts of dissolved inorganic and/or organic impurities, are further purified for use in microelectronics by bringing the previously distilled hydrogen peroxide solution, to which a small amount of chelating agent has been added, into contact with a non-ion exchanging polymeric adsorption agent.

The previously distilled hydrogen peroxide used in the method of the invention, which can originate in particular especially from a process for producing hydrogen peroxide by the anthraquinone process and which has a hydrogen peroxide concentration of about 30 to 50 wt.-%, especially of about 30 to 35 wt.-%, still contains only small amounts of ionic inorganic impurities such as metal cations (e.g., Al, Fe, Zn, etc.) and anions ($NO_3$, $PO_4^2$ etc.) on the one hand, and of organic carbon impurities (e.g., production-caused residues of solvents and derivatives of anthraquinones) on the other. In the method of the invention, therefore, hydrogen peroxide solutions are further purified, in which the content of ionic and organic impurities has been diminished to such an extent, by easy-to-perform, convenient distillation (suitable also for the preliminary purification of relatively large amounts of such hydrogen peroxides), that, in the subsequent additional purification by adsorption, the amount of the adsorbent that is to be used can be kept advantageously low. The individual content of metal cations in the pre-purified hydrogen peroxide in this case is already in the range of less than 10 ppb, preferably even less than 5 ppb, and the total anion content is in the range below 300 ppb. The total content of organic carbon impurities amounts to a maximum of about 20 ppm (20 mg/l), but preferably to only about 10 to 15 ppm (10 to 15 mg/l). In view of these already very low impurity contents in the hydrogen peroxide, it is all the more surprising that the simple purifying method of the invention can not only drastically decrease the content of organic carbon impurities, but in addition the content of the so-called key elements in the hydrogen peroxide, such as Na, Mg, Al, Ca, Fe, Zn and K, can be definitely lowered still further.

The distillative purification of aqueous hydrogen peroxide solutions, especially those made by the anthraquinone process, is generally performed in the prior art by distillation in aluminum or high-grade steel columns, in which the hydrogen peroxide is adjusted to concentrations of, for example, about 70 wt.-% $H_2O_2$. Such commercial hydrogen peroxide could also be treated by the method of the invention and further purified. Since, however, this quality of hydrogen peroxide, which is also referred to as "single distillate," still contains relatively large amounts of ionic inorganic and organic impurities, in an advantageous further embodiment of the invention, the single distillate is diluted with demineralized water (especially to $H_2O_2$ concentrations of about 56 wt.-%) and subjected to another distillation in a glass column. As the top product ("double distillate") an approximately 30 to 35 wt.-% hydrogen peroxide solution is obtained which, after the addition of a chelating agent, can then, for further purification according to the invention, be contacted with the non-ion-exchanging polymeric adsorbent.

In one very advantageous embodiment of the invention, however, it is not the above double distillate that is used, but a so-called "triple distillate." This triple distillate is obtained by first removing from the aforementioned second distillation the bottom product that occurs having an 85 wt.-% $H_2O_2$ content, which still contains organic impurities, for example, in an amount of about 20 mg/l, and diluting it with demineralized water, particularly to about 56 wt.-%. This dilute hydrogen peroxide bottom product is then subjected to still another distillation in a glass column, whereby the triple distillate is obtained as top product with a hydrogen peroxide concentration of likewise especially about 30 to 35 wt.-%. This triple distillate contains organic impurities, for example, in an amount of only about 10 to 15 mg/l, and this very low content of organic impurities can be decreased very efficiently by the method of the invention to far below a content of 10 ppm, especially below 5 ppm.

In a very advantageous variant of the aforedescribed distillations for obtaining double distillate and triple distillate, glass columns of borosilicate glass are used, and all of the tubing and connectors of the still which may come in contact with hydrogen peroxide are formed of polyethylene or polyvinylidene fluoride. In this advantageous variant, hydrogen peroxide starting solutions for the process of the invention which already have especially low metal cation contents can be prepared, and even better purifying effects can be achieved.

According to the method of the invention, a small amount of a chelating agent is added to the hydrogen peroxide that is to be purified, before the hydrogen peroxide is treated with the non-ion-exchanging polymeric adsorbent. Basically all chelating agents known in the art, which have a high chelating capacity for the cations to be removed, are suitable for this purpose. Chelating agents which contain carboxyl groups or phosphonic acid groups are especially suitable. Phosphonic acids of the ethyleneamine methylenephosphonic acid type are preferred. It is self-evident that the chelating agents must be very pure and be in acid form. Examples of such chelating agents which can be used in the method of the invention include hydroxyethylethylenediaminetriacetic acid, nitrilotriacetic acid, ethylenediaminetetraacetic acid, di-ethylenetriaminepentaacetic acid, triethylenetetraaminehexaacetic acid, nitrilotri-(methylenephosphonic acid), 1-hydroxyethylidene-1,1-diphosphonic acid ethylenediaminetetra-(methylenephosphonic acid), diethylenetriaminepenta-(methylenephosphonic acid), dihydroxyethylglycine, and hydroxyethylamine diacetic acid. For the practice of the method of the invention, only small amounts of the above chelating agents need to be added to the hydrogen peroxide being purified. Since the amount of impurities in the hydrogen peroxide is on the order of magnitude of parts per billion, it is sufficient to add only a few milligrams of the chelating agent per liter of hydrogen peroxide to be purified. Preferably the added quantity of chelating agent will correspond at least to the stoichiometric amount requied for chelating the residual dissolved inorganic impurities and at most to a 100% excess of the stoichiometric amount. A preferred embodiment of the method of the invention is therefore characterized by the fact that the chelating agent is added to the hydrogen peroxide in the amount of 5 to 20 mg/l.

In accordance with the method of the invention, the hydrogen peroxide with the chelating agent added is then brought into contact with a non-ion-exchanging polymeric adsorbent. For this purpose the hydrogen peroxide containing the chelating agent is mixed with the adsorbent in a bed process, for example, or preferably put through a column filled with the adsorbent. The rate of flow of the hydrogen peroxide through the adsorbent-filled column is to be adjusted such that the content of carbon in the eluate does not exceed the maximum permissible amount. For a total volume of one liter of adsorbent, flow rates between 1 and 15 liters per hour are preferred for this purpose. The purified hydrogen peroxide which exits the adsorption column is collected in an appropriate container. If the adsorption is performed in a bed process, the hydrogen peroxide, after treatment with the non-ion-exchanging polymeric adsorbent, is freed from the adsorbent by filtration, and the purified hydrogen peroxide is also collected in a suitable container. It is important for the success of the method of the invention that all of the apparatus and containers used during the purification consist of appropriate materials so that the high-purity hydrogen peroxide will not be re-contaminated by metal ions, for example, from the containers and tubing. Borosilicate glass, polytetrafluoroethylene (PTFE), polyvinylidene fluoride (PVDF) and high-pressure polyethylene (HDPE) have proven to be especially suitable materials. The method of the invention is thus characterized by great simplicity. Furthermore it can also be practiced at room temperature.

Suitable non-ion-exchanging adsorbents in the meaning of the invention include, in particular, polymeric styrene resins cross-linked with divinylbenzene, which are free of components that can be washed out, such as monomers and polymerization adjuvants. These adsorbents are preferably styrene polymers which have been obtained by suspension polymerization of styrene with a content of about 5 to 15 wt.-%, especially about 8 to 12 wt.-%, of divinylbenzene. These adsorbents have no ionic functional groups and are therefore completely non-ionic hydrophobic polymers whose adsorptive properties arise from the macroreticular structure, the wide range of pore sizes, the unusually great surface area, and the aromatic nature of this surface. These styrene-divinylbenzene copolymer adsorbents are thus clearly distinct in this regard from cation and anion exchange resins, which due to the functional groups they contain are very sensitive to oxidation and therefore when they are used for purifying hydrogen peroxide they must be handled with special care (for example by operating at 0° C.). On the other hand, the adsorbents used according to the invention are stable against oxidation and can be used comfortably even at ordinary ambient temperatures such as, for example, about 20° to 25° C. The styrene- divinylbenzene copolymer adsorbents used in accordance with the invention are used in the method of the invention as white, insoluble beads having the following typical properties (determined for the dry polymer resin): pore volume about 0.5 ml/ml of matrix; surface area about 800 m$^2$/g; average pore volume 400 to 600 nm. Other typical properties of the styrene- divinylbenzene copolymer adsorbents are an average particle diameter of about 0.35 to 0.45 mm, and the density of about 1 g/ml. These hydrophobic adsorbents have a high affinity for hydrophobic organic substances, but their affinity for hydrophilic substances such as water or hydrogen peroxide is low.

Before using the styrene-divinylbenzene copolymer adsorbents, it is recommended as advantageous to wash the adsorbent free of production-induced impurities with a lower alcohol, preferably with pure methanol, since such impurities are undesirable because they can degrade hydrogen peroxide. Of course, after use in the process of the invention the adsorbent can be freed of the sorbate by regeneration in a known manner to prepare it for reuse.

The invention offers an especially simple and advantageous method for purifying hydrogen peroxide for applications in microelectronics. The method of the invention is characterized in particular by the fact that it not only succeeds in further decreasing already very low contents of carbon (organic) impurities in the hydrogen peroxide, but that the metal cation content, especially the content of key elements such as sodium, magnesium, aluminum, calcium, iron, zinc and potassium, can also be further decreased in an unexpected and surprising manner. In addition, hydrogen peroxide solutions purified in accordance with the invention have a decidedly improved stability. The hydrogen peroxide solutions purified according to the invention furthermore satisfy the high purity requirements that must be met in the production of 16 megabit chips.

The following examples are intended to further illustrate the invention without limiting its scope.

EXAMPLES

To demonstrate the efficiency of the method of the invention, the following aqueous solutions of hydrogen peroxide and adsorbents were used, and the following methods of analysis were applied.

HYDROGEN PEROXIDE

A so-called "triple distillate" (containing about 35 wt.-% of $H_2O_2$) from distillation in borosilicate glass columns was used. The starting solutions were prepared by first concentrating aqueous hydrogen peroxide solutions from the anthraquinone process, by distillation in an aluminum column to a content of about 70 wt.-% $H_2O$. The resulting 70 wt.-% hydrogen peroxides were then diluted with demineralized water to a concentration of about 56 wt.-% $H_2O_2$ and again distilled in a borosilicate glass column, thus obtaining an approximately 35 wt.-% $H_2O_2$ top product ("double distillate") and an 85 wt.-% $H_2O_2$ bottom product. The $H_2O_2$ bottom product, which still had a carbon content of about 20 mg/l, was subjected to another distillation in a borosilicate glass column. Hydrogen peroxide solutions ("triple distillate") were obtained as the top product from the third distillation having a content of about 35 wt.-% and a carbon content of about 12 mg per liter, which were used as starting solutions for the purification process of the invention.

ADSORBENTS

Non-ion-exchanging polymeric styrene-divinylbenzene copolymers having a divinylbenzene content of 8 to 10% and the following properties were used as adsorbents:
  Average particle diameter: 0.35 to 0.35 mm
  Wet density: 1.03 to 1.04 g/ml
  Pore volume: 0.50 ml per ml of dry copolymer
  Surface area: approx. 800 m$^2$/g (dry copolymer)
  Average pore diameter: 400 to 600 nm (dry copolymer)

In particular, styrene-divinylbenzene copolymers sold commercially by Rohm & Haas under the trademark "Amberlite" as XAD type resins (preferably XAD-2 and XAD-4) were used.

Before use in the process of the invention, the styrene-divinylbenzene copolymers were washed with pure methanol to free them from washable components such as residual monomers and polymerization adjuvants etc. Then the copolymers were washed again with demineralized water until free of carbon (i.e., until free of organic components including methanol). The adsorbent was then ready for use in the method of the invention.

ANALYSES

The metal cation content in the hydrogen peroxide solutions was determined by mass spectrometry with inductively coupled plasma (IPC-MS). The organic carbon content was determined by infrared spectroscopy.

EXAMPLE 1

One liter of the styrene-divinylbenzene copolymer prepared as described above was placed in a cylindrical column of polyethylene with a height of 250 mm and a diameter of 100 mm. Then the column was fed with 600 ml of 35 wt.-% hydrogen peroxide (triple distillate) to which 10 mg/l of ethylenediaminotetramethylenephosphonic acid (EDTMP) had been added. The rate of flow of the hydrogen peroxide solution through the column was adjusted to 1 ml per minute per milliliter of copolymer. While the hydrogen peroxide was flowing through the column the copolymer did not become warm in the column; no exothermic reaction between resin and hydrogen peroxide occurred. The purified hydrogen peroxide flowing from the column was collected in containers of high-pressure polyethylene or polyvinylidene fluoride and analyzed for metal cation content by mass spectrometry and for organic carbon by IR spectroscopy. The results of the analysis are given in Table 1.

In addition to the above analysis of the metal cation and organic carbon content, the stability of the hydrogen peroxide solutions before (triple distillate) and after the purification process of the invention, was determined as stability loss (ml $O_2$/min). The stability loss is given by the amount of oxygen in ml developed in a 25 ml sample at 100° C. The result is also given in Table 1.

TABLE 1

|  | Hydrogen peroxide starting solution (triple distillate) | Hydrogen peroxide Purified according to Invention |
|---|---|---|
| a) Impurities | | |
| a1) Cations (ppb) | | |
| Li | 3.8 | 1.5 |
| B | 1.5 | 1.2 |
| Na | 3.2 | 2.2 |
| Mg | 2.0 | 0.5 |
| Al | 1.5 | 0.7 |
| Ca | 3.2 | 0.9 |
| Cr | 0.8 | 0.9 |
| Fe | 1.2 | 1.2 |
| Mn | 0.4 | 0.4 |
| Ni | 3.7 | 2.5 |
| Cu | 0.7 | 0.7 |
| Zn | 6.4 | 0.8 |
| Pb | 0.8 | 0.3 |
| K | 3.0 | 2.0 |
| a2) Organic C (ppm) | 12 | 7 |
| b) Loss of stability in ml $O_2$ per min. | 0.27 | 0.20 |

EXAMPLES 2 AND 3

Additional purification tests were performed as described in Example except the 35.6 wt.-% hydrogen peroxide starting solutions (triple distillates) had carbon contents of 13 mg per liter. After the addition of 15 mg/l of diethylenetriaminopentamethylenephosphonic acid as chelating agent (DTPMP), the hydrogen peroxide starting solutions were passed at a rate of about 17 ml per minute through 800 g of previously treated styrene-divinylbenzene copolymer in a plastic column (HDPE, 10 cm diameter, fill depth 15 cm). Metal cation contents approximately equal to those of Example were found. The remaining results, especially the organic carbon contents and the decomposition losses are listed in the following Table 2.

TABLE 2

| | Hydrogen peroxide after purification according to the invention | | | |
|---|---|---|---|---|
| | Quantity (l) | Hydrogen peroxide content (wt.-%) | Carbon content (ppm) | Degradation loss (ml of oxygen per minute) |
| Example 2 | 27 | 34.2 | 4 | 0.13 |
| Example 3 | 27 | 34.9 | 5 | 0.15 |

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A method for further purifying distilled hydrogen peroxide containing residual metal ions and organic carbon impurities to effect removal thereof while avoiding contact with an ion exchange resin carrying ionic functional groups, said method comprising the steps of adding a chelating agent to said distilled hydrogen peroxide, and thereafter contacting said hydrogen peroxide with a non-ion-exchanging polymeric adsorbent free of ionic functional groups.

2. A method according to claim 1, wherein said distilled hydrogen peroxide has been distilled through a borosilicate glass column.

3. A method according to claim 1, wherein said chelating agent is added to said distilled hydrogen peroxide in an amount of 5 to 20 mg/liter.

4. A method according to claim 1, wherein said polymeric adsorbent is a copolymer of styrene and divinylbenzene.

5. A method according to claim 4, wherein said polymeric adsorbent is a copolymer of 88 to 92 wt.-% styrene and 8 to 12 wt.-% divinylbenzene are used.

6. A method according to claim 1, wherein said contacting step is carried out by passing said distilled hydrogen peroxide through a column containing a bed of said polymeric adsorbent.

7. A process according to claim 1, wherein a quantity of chelating agent is added which corresponds at least to the quantity which is stoichiometrically required for chelating said residual amounts of dissolved inorganic impurities and which corresponds at most to a 100 % excess of said stoichiometrically required quantity.

* * * * *